F. F. LANDIS.

CENTRIFUGAL GRAIN SEPARATOR.

No. 11,644. Reissued Dec. 28, 1897.

WITNESSES

Franck L. Durand.

George J. Weber.

INVENTOR

Frank F. Landis per, E. O. Bradford

Attorney

UNITED STATES PATENT OFFICE.

FRANK F. LANDIS, OF WAYNESBOROUGH, PENNSYLVANIA.

CENTRIFUGAL GRAIN-SEPARATOR.

SPECIFICATION forming part of Reissued Letters Patent No. 11,644, dated December 28, 1897.

Original No. 551,498, dated December 17, 1895. Application for reissue filed March 22, 1897. Serial No. 628,777.

*To all whom it may concern:*

Be it known that I, FRANK F. LANDIS, a citizen of the United States, residing at Waynesborough, in the county of Franklin and State of Pennsylvania, have invented certain new and useful Improvements in Centrifugal Grain-Separators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to centrifugal grain-separators; and it consists in the novel construction and arrangement of parts hereinafter fully described and claimed.

Figure 1:
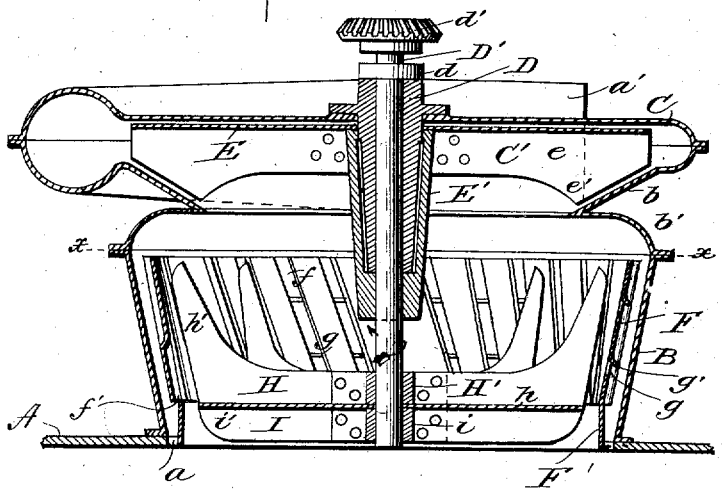
Figure 2:
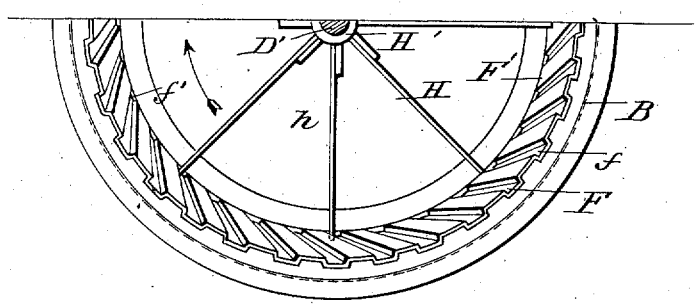

In the drawings forming a part of this application, Figure 1 is a vertical section of a grain-separator constructed according to this invention; and Fig. 2 is a horizontal section looking downwardly from the dotted line *x x* in Fig. 1, showing one-half only of said separator.

A is a base-plate provided with an inlet-opening *a*. B is a circular inclosing case, preferably conical in form and secured to the base-plate around said opening.

C is the casing of the discharger C′. This casing C is secured to the top of the case B, and is preferably provided with a conical throat-piece *b* and a concave portion *b′*, formed integral with it and connecting it to the top of the case B. The casing C is also provided with a delivery-pipe *a′*.

D is a bearing secured to the casing C and depending centrally within it.

D′ is a shaft journaled in the bearing D. This shaft is provided with a collar *d*, resting on the top of the bearing, and means for revolving it, such as the wheel or pulley *d′*.

The discharger C′ is provided with radial arms *e*, preferably having projections *e′*, which run in the throat-piece *b*.

E is a disk above the arm *e*. The arms and disk are secured to a long hub E′, which is fastened to the shaft D′ below the bearing D. This hub encircles the bearing and is journaled on the upper part of it.

F is a circular separating-chamber supported in the case B. This chamber is preferably conical and larger at the top.

F′ is a cylindrical mouthpiece at the bottom of the chamber F. The chamber F is provided with grooves or corrugations *f* in its sides, and these grooves are preferably inclined or arranged spirally with respect to the vertical axis of the chamber. These grooves or corrugations have openings *f′* at their bottoms, and openings *g*, having outwardly-projecting lips *g′* at points in their length on the periphery of the chamber.

H are radial arms secured to a hub H′, which is fastened on the lower end of the shaft D′, and *h* is a disk under the arms H. The arms H preferably have extensions *h′* on their upper sides, and their outer edges are substantially parallel with the periphery of the separating-chamber.

I are narrow radial arms secured to a hub *i*, which is fastened to the shaft D′ below the disk *h*. The arms I are arranged in the cylindrical mouthpiece F′, and their lower corners *i′* are preferably rounded.

The separator is mounted in connection with the threshing mechanism in any approved manner—such, for example, as shown in my Patent No. 551,495—or may be used in connection with threshing mechanism such as shown in my Patent No. 551,494. Most of the grain leaves the straw at the threshing devices, as is usual. The straw, which still has some grain mixed with it, is conducted to the under side of the separating-chamber and is caught by the arms I and flung to the periphery of the mouthpiece F′. A strong current of air is drawn through the separating-chamber by the discharger across the direction of the centrifugal action produced by the arms, and the straw is drawn upward into said chamber thereby in a loose thin annular stream between the edge of the spreading-disk *h* and the said throat-piece. The straw being thus spread out into a thin sheet and turned partly in passing up into said chamber much of the grain therein is released and falls down by gravity to the floor. The arms H, with their projections *h′*, act to whirl the straw around rapidly in said chamber in its loose thinly-distributed condition, and the remaining grain therein is thrown out therefrom by centrifugal force. The grooves $f$ are inclined upwardly in a direction opposite to the direction of the motion of the arms H, and the kernels coming into said grooves are forced downward by said inclination and by gravity. Said kernels pass through the openings $f'$ and $g$ and fall through the opening $a$ in the base-plate. The straw is drawn upwardly by the discharger and the conical form of the chamber in which it is being rapidly whirled around, which form also serves to still further loosen and separate the straws to facilitate the ready release of the grain therefrom. As it leaves said chamber its natural tendency is to fly outward and upward, thus striking the concave portion $b'$, and by it being guided into the discharger-casing, which operates to turn or partially turn the straw and release any grain which may yet be held therein, which falls down by gravity between the case B and chamber F and is discharged with the rest. The straw being drawn into the discharger is whirled around and around thereby and blown out at the delivery-pipe $a'$ with considerable force. By this arrangement a most thorough separation is effected in a small space, and by arranging the parts in a vertical position the centrifugal force throws the grain free from the straw in a direction from which it will not fall back and be again mixed therein.

Having thus fully described my said invention, what I claim as new, and desire to secure by Letters Patent, is—

1. The combination with threshing mechanism, of separating mechanism consisting of an outer vertical case, a chamber within said case, a discharger beyond the discharge end of said chamber, a rotary reel or arms within said chamber, apertures in the sides of said chamber, and discharge-openings from said case for the grain, substantially as set forth.

2. A separator for threshing-machines consisting of a vertical case, a chamber therein, a discharger beyond the discharge end of said case, a rotary reel or arms in said chamber, a spreading-disk covering the greater portion of the entrance to said chamber, and openings for the discharge of the grain, substantially as set forth.

3. A separator for threshing-machines consisting of an outer vertical casing, a chamber therein, a discharger at the discharge end of said chamber, a shaft with a reel or arms within said chamber, a spreading-disk on said shaft at the entrance to said chamber, other arms carried by said shaft on the opposite side of said disk, and discharge-apertures for the grain, substantially as set forth.

4. A separator for threshing-machines consisting of a vertical separating-chamber surrounded by a suitable casing, a discharger communicating therewith, separate means for whirling the straw around in said chamber, and openings for the discharge of the grain, substantially as set forth.

5. A separator for threshing-machines consisting of a vertical separating-chamber having an annular entrance near its periphery and a suitable casing surrounding said chamber, a discharger, and means for whirling around the straw within said chamber, substantially as set forth.

6. A separator for threshing-machines consisting of a vertical separating-chamber, a suitable casing surrounding the same, a discharger, and means for whirling around the straw within said chamber, which chamber is formed with grooves or corrugations in its sides extending in a direction across its height, substantially as set forth.

7. A separator for threshing-machines consisting of a vertical chamber, a casing surrounding it, a discharger connected therewith, means for whirling around the straw in said chamber, and inclined or spirally-arranged grooves or conveyers extending across the wall of said chamber in the direction of its height, substantially as set forth.

8. A separator for threshing-machines consisting of a vertical separating-chamber, a case surrounding said chamber, a discharger, separate means for whirling around the straw in said chamber, which chamber is made with tapered sides larger at its top than at its bottom, substantially as set forth.

9. A separator for threshing-machines consisting of a vertical separating-chamber having tapered perforated sides, a case surrounding said chamber, a discharger, and separate means for whirling around the straw in said chamber, substantially as set forth.

10. In a separator for threshing-machines, the combination of the outer case, the separating-chamber therein, the discharger-casing beyond the discharge end of said separating-casing, the discharge-fan therein, means for whirling around the straw in said chamber, apertures for the discharge of the grain, and a curved or concave part $b'$ connecting the top of the case with the entrance of the discharger-casing, which is formed smaller than the discharge end of the separating-chamber, substantially as set forth.

11. The combination, with the vertical grain-separating chamber having substantially upright grooves in its periphery and lateral openings for the passage of the grain, of means for whirling around the straw in said chamber, substantially as set forth.

12. The combination with the vertical grain-separating chamber having spirally-arranged substantially upright grooves in its periphery and lateral openings for the passage of the grain, of means for whirling around the straw in said chamber, substantially as set forth.

13. The combination, with a grain-separating chamber conical in form and larger at its upper end, said chamber being provided with substantially upright grooves in its periphery and having openings $f'$ and $g$ at the bottoms and at the lower ends of the grooves for the passage of grain; of means for whirling around the straw in said chamber, substantially as set forth.

14. The combination with a grain-separating chamber provided with substantially upright grooves in its periphery, and a mouthpiece below the said grooves having openings $f'$ and $g$; of revoluble arms for whirling around straw in the said mouthpiece and in the said chamber, and a horizontal disk secured to said arms at the entrance to said chamber, substantially as set forth.

15. The combination, with a grain-separating chamber provided with substantially upright grooves in its periphery, and an inclosing case; of a concave portion secured to the top of the case and extending over the periphery of the said chamber, a discharger-casing above the said concave portion, a shaft journaled centrally of the said chamber, a discharger secured on said shaft in said casing, and arms secured on the said shaft below the said discharger and operating to whirl around the straw in the said chamber, substantially as set forth.

In testimony whereof I affix my signature in presence of two witnesses.

FRANK F. LANDIS.

Witnesses:

T. S. CUNNINGHAM,

E. W. BRADFORD.